United States Patent [19]

Yoshinaka et al.

[11] 4,393,143

[45] Jul. 12, 1983

[54] AMORPHOUS REFRACTORY SETTABLE AT LOW TEMPERATURES

[75] Inventors: Satoru Yoshinaka, Okayama; Masao Fushida, Bizen; Tatsuzi Kimoto, Okayama, all of Japan

[73] Assignee: Tsurumi Synthetic Refractories Co., Ltd., Japan

[21] Appl. No.: 266,299

[22] Filed: May 22, 1981

[51] Int. Cl.$^3$ .............................................. C04B 35/52

[52] U.S. Cl. ........................................ 501/89; 501/90; 501/99; 501/100; 501/109; 501/111; 501/128

[58] Field of Search ................. 501/100, 109, 111, 89, 501/90, 99, 128

[56] References Cited

U.S. PATENT DOCUMENTS 4,218,256 8/1980 Videtto .............................. 501/111

4,306,030 12/1981 Watanabe et al. ................. 501/100

*Primary Examiner*—James Poer

*Attorney, Agent, or Firm*—McGlew and Tuttle

[57] ABSTRACT

An amorphous refractory settable at low temperatures comprises a usual refractory material, a metal powder in an amount of 0.5 to 5% by weight based on the whole amount of the refractory and serving as a sintering agent and a phosphate glass powder in an amount of 0.5 to 3% by weight based on the whole amount and serving as a sintering and setting agent. A pitch powder can be further incorporated in the refractory in an amount of 0.1 to 6% by weight based on the whole amount to render the refractory settable more effectively at low temperatures. The refractory is usable in the form of a dry powder without using any water or other liquid for lining troughs and containers for molten metals.

5 Claims, No Drawings

AMORPHOUS REFRACTORY SETTABLE AT LOW TEMPERATURES

FIELD AND BACKGROUND OF THE INVENTION

The present invention relates, in general, to amorphous refractories and more particularly to a novel and useful refractory which is settable at low temperatures and which is used chiefly for lining containers and troughs, such as melting furnaces, smelting furnaces, ladles, tundishes, cupola subfurnaces, and the like.

As is well known, conventional refractory linings are applied as kneaded with about 3 to about 10% by weight of water or other liquid. The resulting lining must be heated at a high temperature for drying before the lined structure is placed into actual operation. Thus, a large amount of heat energy is required and the procedure is time consuming. Additionally, the heat drying procedure involves a serious risk that the lining may be ruinously damaged by cracking and separation. It has, therefore, long been considered desirable in the concerned industry to basically overcome the above problems in order to decrease cost, reduce the shutdown period of the lined structure and prolong the life of the lining.

SUMMARY OF THE INVENTION

The main object of the present invention is to solve all the foregoing problems and to meet the strong demand of industries, especially of the iron and steel industry.

Accordingly, an amorphous refractory settable at low temperatures, in accordance with the invention, includes a refractory material, a silicon powder in an amount of 0.5 to 5%, by weight, and a phosphate glass powder in an amount of 0.5 to 3%, by weight, which is usable as a liquidless composition in the form of a dry powder. In accordance with a further preferred embodiment of the invention, the amorphous refractory includes a pitch powder in an amount of 0.1 to 6%, by weight.

The various features of novelty which characterize the invention are pointed out with particularity in the claims annexed to and forming a part of this disclosure. For a better understanding of the invention, its operating advantages and specific objects attained by its uses, reference is made to the descriptive matter in which preferred embodiments of the invention are illustrated.

DETAILED DESCRIPTION

The invention provides an amorphous refractory comprising a usual refractory material, a silicon powder in an amount of 0.5 to 5%, by weight, based on the whole amount of the refractory, serving as a sintering agent, and a phosphate glass powder in an amount of 0.5 to 3%, by weight, based on the whole amount of the refractory, serving as a sintering and setting agent, the refractory is usable in the form of a powder. The invention further provides an amorphous refractory comprising a usual refractory material, a silicon powder in an amount of 0.5 to 5%, by weight based on the whole amount of the refractory, serving as a sintering agent, a phosphate glass powder in an amount of 0.5 to 3%, by weight based on the whole amount of the refractory, serving as a sintering and setting agent, and a pitch powder in an amount of 0.1 to 6%, by weight based on the whole amount of the refractory, serving as a low-termperature setting agent, the refractory being usable in the form of a powder.

The silicon powder, contained in the refractory of the invention serves as a cross-linking sintering agent. Such silicon powder has reactivity which is highly sensitive to the sintering temperature, so that if an excess of silicon powder, for example, is present in the refractory, the resulting structure is likely to locally involve a marked difference in strength, or like property, due to uneven heating, consequently developing cracks that would lead to structural breakdown. Accordingly, the upper limit of the amount of the silicon powder to be incorporated in the present refractory must be 5%. On the other hand, when present in an amount of less than 0.5%, the silicon powder fails to function as the cross-linking sintering agent. Thus, the proportion of the silicon powder should be 0.5 to 5%, by weight based on the whole refractory as mentioned above.

It is advantageous to use different kinds of powders (such as aluminum or like metal) conjointly since the different reaction temperatures thereof serve to reduce the differences in properties that could result from sintering.

The phosphate glass powder used as a sintering and setting agent for the refractory of the invention produces a cross-linking sintering action as is well known. The glass powder further acts to set the refractory when melting at a low temperature of 250° to 300° C.

When the refractory of this invention contains more than 3% by weight of phosphate glass, the following drawbacks will result. First, the liquid phase of glass formed on melting and remaining in the structure without dissipation contracts to cause cracking, gives reduced refractory properties to the product and becomes more chemically reactive with molten metal or slag. Second, it becomes difficult to advantageously utilize the characteristics that the cross-linking sintering action of the phosphate glass powder is less sensitive to temperature than the cross-linking reaction afforded by the silicon powder. More specifically stated, use of more than 3%, by weight of phosphate glass powder produces a marked difference in structural strength and like properties due to a difference in reaction temperature, giving rise to stress concentration in the interior of the resulting structure in the vicinity of where such a difference is present and permitting the structure to internally crack or break down.

To eliminate these two objections, above all the first-mentioned objection, the proportion of the phosphate glass powder should be up to 3%, by weight based on the whole amount of the refractory.

On the other hand, the phosphate glass powder, if present in an amount of less than 0.5%, by weight fails to produce a cross-linking effect and is almost unable to achieve any setting effect.

For the reasons given above, the proportion of the phosphate glass powder is limited to the range of 0.5 to 3%, by weight.

The phosphate glass powder, when incorporated in the refractory of the invention as a sintering and setting agent in an amount of 0.5 to 3%, by weight based on the whole refractory, thus produces not only a sintering effect but also a setting effect as described, while a pitch powder, when used as a low-temperature setting agent in an amount of 0.1 to 6%, by weight, acts to set the refractory more effectively at low temperatures.

The present invention utilizes the characteristics of pitch powder that it becomes softened and then hardened (carbonized) when heated. When a structure is to be lined with the refractory of the invention, the refractory in the form of a dry powder is applied to the desired portion, then supported by forms or retaining panels and thereafter heated to soften and melt the pitch powder, causing the molten pitch to capture the refractory aggregate particles or grains, which are adhered together and set into a lining when the pitch is hardened through further heating.

If the refractory of this invention contains more than 6% of the pitch powder, by weight, the pitch powder, when softened as above, permits the lining structure to plastically deform or collapse under gravity. When softened, melted and then hardened, the excess of pitch produces a large amount of gas causing pollution and gives rise to cracking or the like, i.e. the same phenomonon as is attendant on the drying of water-containing refractories. Furthermore, even after the hardening (carbonization) of the pitch, a large amount of pitch still remains inflammable in the interior of the structure, with the resulting drawback that depending on the conditions in which the lining is used, the disadvantage of reduced structural strength due to the burning of pitch surpasses the advantage that the pitch renders the lining less wettable by molten metal.

On the other hand, the pitch powder, when present in an amount of less than 0.1%, by weight, fails to serve as a low-temperature setting agent.

The amount of the pitch powder is therefore limited to the range of 0.1 to 6%, by weight based on the whole amount of the refractory.

The proportion of the pitch powder is, of course, variable in accordance with the proportion of the phosphate glass powder.

The refractory of the present invention, whether it contains a pitch powder or not, is used in the form of a dry powder without necessitating the use of any water or other liquids.

Our experiments have revealed that the preferred particle size distribution of the present refractory is such that it contains 50 to 70% of particles larger than 1 mm, 12 to 22% of those ranging from 1 to 0.088 mm in size and 20 to 30% of those smaller than 0.088 mm.

When the refractory has such particle size distribution, the vaporizable substance contained in the ingredients can be dissipated easily, the refractory, although in the form of a dry powder, can be applied compactly to the portion to be lined while retaining such structural strength as to retain a shape, and the refractory can be sintered and set or hardened by the setting and sintering agents as desired to exhibit the required properties.

Because the refractory of this invention having the foregoing composition is usable in the form of a dry powder without necessitating any water or other liquid, the refractory is free of the problems encountered with conventional amorphous refractories. More specifically, the invention has basically eliminated the serious drawbacks that the lining formed from the known refractory which is kneaded with water or other liquid must be heated at a high temperature for drying before it is placed into actual operation and that the conventional refractory requires a heat energy and time-consuming drying procedure which is likely to subject the lining to ruinous damages such as cracking and separation. In this respect, the invention has immense industrial usefulness. Moreover, since the setting agent and sintering agent incorporated in the refractory of this invention are suitable for a wide variety of refractory materials, i.e. aggregates, any desired one of refractory aggregates generally used can be selected for use. In this respect also, the invention is of outstanding usefulness.

Examples of the present invention are given below.

EXAMPLE 1

| (1) Composition | | |
|---|---|---|
| Ingredients | | Proportions (%) |
| Alumina | | 81.7 |
| Silicon carbide | | 9.6 |
| Silicon powder | | 1.9 |
| Phosphate glass powder | | 1.9 |
| Pitch powder | | 4.9 |
| Water | | 0 |
| Particle size distribution | | |
| Larger than 1 mm: 53% | | |
| 1 to 0.088 mm: 21% | | |
| Smaller than 0.088 mm: 26% | | |
| (2) Properties | | |
| Porosity (%) | 400° C. × 2 hrs. | 24.8 |
| | 800° C. × 2 hrs. | 27.1 |
| | 1450° C. × 2 hrs. | 21.6 |
| Bulk density (g/cm³) | 400° C. × 2 hrs. | 2.58 |
| | 800° C. × 2 hrs. | 2.58 |
| | 1480° C. × 2 hrs. | 2.60 |
| Compressive strength (kg/cm²) | 400° C. × 2 hrs. | 46 |
| | 800° C. × 2 hrs. | 138 |
| | 1450° C. × 2 hrs. | 120 |
| (3) Lining results | | |
| Lining for: Pig iron discharge trough of blast furnace | | |
| Amount of refractory used | | 11 tons |
| Time required for lining: | | 30 minutes |
| Heating time before use: | | 50 minutes |
| Standing time before use after lining: | | 80 minutes |
| Rate of erosion: | | 2.19 mm/10000 tons |

(Note: Rate of erosion of usual ramming mixture as used for the same trough: 4-5 mm/10000 tons)

EXAMPLE 2

| (1) Composition | | |
|---|---|---|
| Ingredients | | Proportions (%) |
| High alumina | | 52.4 |
| Alumina | | 28.6 |
| Silicon carbide | | 10.0 |
| Silicon powder | | 1.9 |
| Phosphate glass powder | | 1.9 |
| Pitch powder | | 5.2 |
| Water | | 0 |
| Particle size distribution | | |
| Larger than 1 mm: 51% | | |
| 1 to 0.088 mm: 25% | | |
| Smaller than 0.088 mm: 24% | | |
| (2) Properties | | |
| Porosity (%) | 400° C. × 2 hrs. | 26.4 |
| | 800° C. × 2 hrs. | 25.5 |
| | 1450° C. × 2 hrs. | 22.1 |
| Bulk density (g/cm³) | 400° C. × 2 hrs. | 2.56 |
| | 800° C. × 2 hrs. | 2.53 |
| | 1450° C. × 2 hrs. | 2.57 |
| Compressive strength (kg/cm²) | 400° C. × 2 hrs. | 76 |
| | 800° C. × 2 hrs. | 131 |
| | 1450° C. × 2 hrs. | 117 |
| (3) Lining results | | |
| Lining for: Pig iron discharge trough of blast furnace | | |
| Amount of refractory used | | 6 tons |
| Time required for lining: | | 30 minutes |
| Heating time before use: | | 60 minutes |

-continued

| | |
|---|---|
| Standing time before use after lining: | 90 minutes |
| Rate of erosion | 3.21 mm/1000 tons |

(Note: Rate of erosion of usual castable as used for the same trough: 3.3-3.5 mm/10000 tons)

While specific embodiments of the invention have been described in detail to illustrate the application of the principles of the invention, it will be understood that the invention may be embodied otherwise without departing from such principles.

What is claimed is:

1. An amorphous refractory which is settable at low temperatures consisting essentially of a dry mixture of refractory material, silicon powder in an amount of 0.5 to 5% by weight based on the whole amount of the refractory and serving as a sintering agent, and a phosphate glass powder in an amount of 0.5 to 3% by weight based on the whole amount of the refractory and serving as a sintering and setting agent, the refractory being usable in the form of a powder.

2. An amorphous refractory which is settable at low temperatures consisting essentially of a dry mixture of refractory material, silicon powder in an amount of 0.5 to 5% by weight based on the whole amount of the refractory and serving as a sintering agent, a phosphate glass powder in an amount of 0.5 to 3% by weight based on the whole amount of the refractory and serving as a sintering and setting agent, and a pitch powder in an amount of 0.1 to 6% by weight based on the whole amount of the refractory and serving as a low temperature setting agent, the refractory being usable in the form of a powder.

3. An amorphous refractory as set forth in claim 1 or 2 wherein the refractory has a particle size distribution of 50 to 70 percent of particles larger than 1 mm, 12 to 22 percent of particles ranging from 1 to 0.088 mm, and 20 to 30 percent of particles smaller than 0.088 mm.

4. An amorphous refractory as set forth in claim 1, wherein said refractory material comprises at least one of alumina and silicon carbide.

5. An amorphous refractory as set forth in claim 4, wherein the refractory has a particle size distribution of 50 to 70% of particles larger than 1 mm, 12 to 22% of particles ranging from 1 to 0.088 mm, and 20 to 30% of particles smaller than 0.088 mm.

* * * * *